(12) United States Patent
Hwang et al.

(10) Patent No.: US 10,626,210 B2
(45) Date of Patent: Apr. 21, 2020

(54) METHOD OF PRODUCING METHACRYLATE BLOCK COPOLYMER

(71) Applicants: HYUNDAI MOTOR COMPANY, Seoul (KR); KIA MOTORS CORPORATION, Seoul (KR); INHA UNIVERSITY RESEARCH AND BUSINESS FOUNDATION, Incheon (KR)

(72) Inventors: DuckHyoung Hwang, Seoul (KR); Seok Hwan Kim, Suwon-si (KR); Yong Ku Kwon, Seoul (KR); Daehyeon Hwang, Goyang-si (KR)

(73) Assignees: Hyundai Motor Company, Seoul (KR); Kia Motors Corporation, Seoul (KR); Inha University Research and Business Foundation, Incheon (KR)

( * ) Notice: Subject to any disclaimer, the term of this patent is extended or adjusted under 35 U.S.C. 154(b) by 193 days.

(21) Appl. No.: 15/995,749

(22) Filed: Jun. 1, 2018

(65) Prior Publication Data

US 2019/0169347 A1    Jun. 6, 2019

(30) Foreign Application Priority Data

Dec. 1, 2017    (KR) .......................... 10-2017-0163992

(51) Int. Cl.
  *C08F 220/16*    (2006.01)
  *C08F 220/18*    (2006.01)
  (Continued)

(52) U.S. Cl.
  CPC ........ *C08F 293/005* (2013.01); *C08F 220/18* (2013.01); *C08K 3/30* (2013.01);
  (Continued)

(58) Field of Classification Search
  CPC .................. C08F 220/16; C08F 220/18; C08F 2220/1808; C08F 2220/1825; C08F 212/08; C08F 2438/03
  See application file for complete search history.

(56) References Cited

U.S. PATENT DOCUMENTS 7,211,625 B2 *  5/2007  Tsuji ...................... C08F 293/00
                                                    525/330.3
7,745,553 B2 *  6/2010  Such ...................... C07C 329/00
                                                       526/222

OTHER PUBLICATIONS

Chong, Y.K.; Le, T.P.T.; Moad, G.; Rizzardo, E.; Thang, S.H. Macromolecules 1999, 32, 2071-2074. (Year: 1999).*

(Continued)

*Primary Examiner* — Rip A Lee
(74) *Attorney, Agent, or Firm* — Morgan, Lewis & Bockius LLP

(57) ABSTRACT

A method of producing a methacrylate block copolymer includes operations of (a) preparing a polymer solution comprising a methacrylate polymer block by polymerizing a methacrylate monomer using a polymerization initiator and a reversible addition-fragmentation chain transfer (RAFT) agent in the presence of water or an organic solvent; (b) preparing a polymer solution comprising an acrylate polymer block-containing methacrylate diblock copolymer by adding an acrylate monomer and a styrene monomer to the polymer solution prepared in operation (a); (c) preparing a polymer solution comprising a methacrylate polymer block-containing methacrylate triblock copolymer by adding a methacrylate monomer to the polymer solution prepared in operation (b); and (d) collecting a polymer prepared after operations (b) and (c) and removing the RAFT agent present at a terminal of the polymer by using an amine-based organic material.

11 Claims, 3 Drawing Sheets

(51) Int. Cl.
   *C08F 293/00* (2006.01)
   *C08K 3/30* (2006.01)
   *C08K 5/41* (2006.01)
   *C08K 5/23* (2006.01)
   *C08F 212/08* (2006.01)

(52) U.S. Cl.
   CPC ............... *C08K 5/23* (2013.01); *C08K 5/41* (2013.01); *C08F 212/08* (2013.01); *C08F 220/1804* (2020.02); *C08F 220/1806* (2020.02); *C08F 2438/03* (2013.01); *C08K 2003/3054* (2013.01)

(56) References Cited

OTHER PUBLICATIONS

Chaduc, I.; Girod, M.; Antoine, R.; Charleux, B.; D'Agosto, F.; Lansalot, M. Macromolecules 2012, 45, 5881-5893. (Year: 2012).*
Luo, Y.; Wang, X.; Zhu, Y.; Li, B.-G.; Zhu, S. Macromolecules 2010, 43, 7472-7481. (Year: 2010).*
Legge, T.M.; Slark, A.T.; Perrier, S. Macromolecules 2007, 40, 2318-2326. (Year: 2007).*
Yamago, S.; Iida, K.; Yoshida, J.-I. J. Am. Chem. Soc. 2002, 124, 13666-13667. (Year: 2002).*
J. Chiefari, et al., "Living Free-Radical Polymerization by Reversible Addition-Fragmentation Chain Transfer: The RAFT Process," 1998 American Chemical Society, vol. 31, pp. 5559-5562.

* cited by examiner

Chemical Shift (ppm)

METHOD OF PRODUCING METHACRYLATE BLOCK COPOLYMER

CROSS-REFERENCE TO RELATED APPLICATION

This application claims the benefit of priority of Korean Patent Application No. 10-2017-0163992, filed on Dec. 1, 2017 in the Korean Intellectual Property Office, the disclosure of which is incorporated herein by reference in its entirety.

BACKGROUND

1. Field

Embodiments of the present disclosure relate to a method of producing a methacrylate block copolymer, and more particularly, to a method of producing a methacrylate block copolymer having enhanced heat resistance and impact resistance.

2. Description of the Related Art

Acrylic resins typified by methyl methacrylate (MMA) have been extensively used as transparent optical materials throughout the industry due to excellent optical properties, weather resistance, and mechanical properties thereof. Particularly, acrylic resins have been widely used as materials of optical-related components in for example an image display device in recent years.

MMA resins break more easily than polycarbonates. Thus, a soft material is often used as an impact modifier to cushion the impact and enhance impact resistance of an MMA resin. Often, the MMA resin and the soft material are processed by melting and extruding at a high temperature.

In this case, however, since the MMA resin and the impact modifier have different glass transition temperatures, phase separation occurs in different polymers at a certain temperature and the phase separation cannot be restored even after decreasing the temperature again. Thus, there may be defects due to the phase separation in the final product using the MMA resins in composite polymer materials processed at a temperature of 200° C. or higher, lowering the heat resistance, impact resistance, weather resistance, and transparent optical properties.

SUMMARY

Therefore, it is an aspect of the present disclosure to provide a method of producing a methacrylate block copolymer having enhanced heat resistance and impact resistance with transparent optical properties and excellent weather resistance. Particularly, according to the method, a methacrylate block copolymer having enhanced heat resistance and impact resistance may be produced via block copolymerization of a methacrylate polymer and an acrylate polymer having different glass transition temperatures in an unexpected ratio with respect to other ratios by using a reversible addition-fragmentation chain transfer (RAFT) method.

Additional aspects of the disclosure will be set forth in part in the description which follows and, in part, will be obvious from the description, or may be learned by practice of the disclosure.

In accordance with one aspect of the present disclosure, a method of producing a methacrylate block copolymer includes operations of (a) preparing a polymer solution comprising a methacrylate polymer block by polymerizing a methacrylate monomer using a polymerization initiator and a reversible addition-fragmentation chain transfer (RAFT) agent in the presence of water or an organic solvent; (b) preparing a polymer solution comprising an acrylate polymer block-containing methacrylate diblock copolymer by adding an acrylate monomer and a styrene monomer to the polymer solution prepared in the operation (a); (c) preparing a polymer solution comprising a methacrylate polymer block-containing methacrylate triblock copolymer by adding a methacrylate monomer to the polymer solution prepared in the operation (b); and (d) collecting a polymer prepared after the operations (b) and (c) and removing the RAFT agent present at a terminal of the collected polymer by using an amine-based organic material.

The polymer collected in the operation (d) includes 60 to 90% by weight of the methacrylate monomer, 10 to 40% by weight of the acrylate monomer, and 0.1 to 10% by weight of the styrene monomer based on a total weight of the collected polymer.

The RAFT agent used in operation (a) includes at least one selected from the group consisting of dithioester and trithiocarbonate. The dithioester includes a compound represented by Formula 1 below:

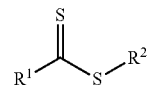

Formula 1 wherein R1 includes at least one selected from the group consisting of an alkyl group, a cycloalkyl group, and an aryl group having 1 to 20 carbon atoms, and R2 is an alkyl group having 1 to 8 carbon atoms. At least one hydrogen atom of the alkyl group of R1 or R2 is substituted with at least one functional group selected from the group consisting of a hydroxyl group, a carboxyl group, and a cyano group. The trithiocarbonate includes a compound represented by Formula 2 below:

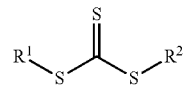

Formula 2 wherein R1 includes at least one selected from the group consisting of an alkyl group, a cycloalkyl group, and an aryl group having 1 to 20 carbon atoms, and R2 is an alkyl group having 1 to 8 carbon atoms. At least one hydrogen atom of the alkyl group of R1 or R2 is substituted with at least one functional group selected from the group consisting of a hydroxyl group, a carboxyl group, and a cyano group.

A molar ratio of the RAFT agent to each of the methacrylate monomer of the operation (a), the acrylate monomer and the styrene monomer of the operation (b), and the methacrylate monomer of the operation (c) is in a range of 1:100 to 500. A molar ratio of the RAFT agent to the polymerization initiator is in a range of 1:5 to 10.

The methacrylate monomers used in the operations (a) and (c) include at least one selected from the group consisting of methyl methacrylate (MMA), ethyl methacrylate, and cyclohexyl methacrylate. The acrylate monomer used in the operation (b) includes at least one selected from the group consisting of methylacrylate, ethylacrylate, butylacrylate, and hexylacrylate, and the styrene monomer includes at least one selected from the group consisting of styrene, α-methylstyrene, p-bromostyrene, p-methylstyrene, p-chlorostyrene, and o-bromostyrene. The amine-based organic material used in the operation (d) includes at least one selected from the group consisting of a primary amine comprising propyl amine, n-butyl amine, t-butyl amine, n-hexyl amine, and n-octylamine, a secondary amine comprising pyridine, pyrrolidine, piperidine, and pyrrole, and 2 equivalents of amines comprising imidazole, pyrimidine, and hydrazine. The polymerization initiator includes at least one selected from the group consisting of azobisisobutyronitrile, 1,1'-azobis(cyclohexanecarbonitrile), a water soluble azo initiator VA-061, a water soluble azo initiator V-501, sodium persulfate, potassium persulfate, ammonium persulfate, and sodium dodecyl sulfate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
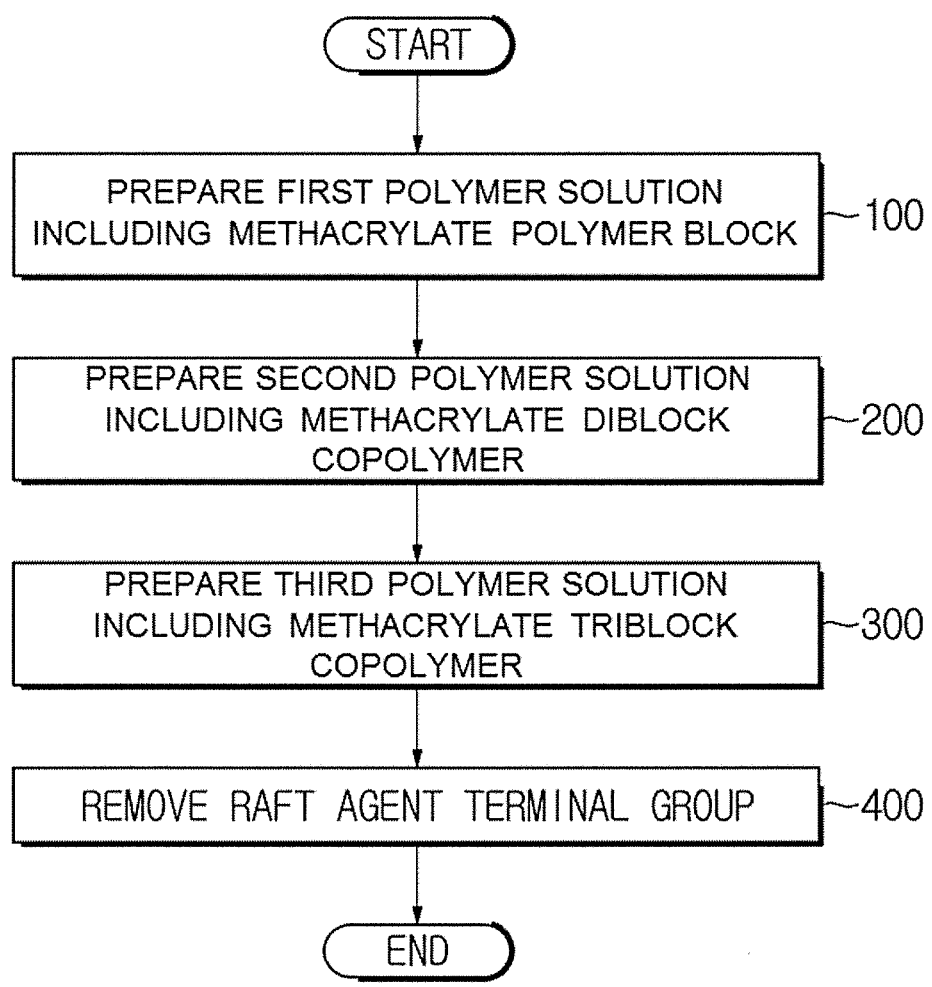
FIG. 1 is a flowchart illustrating a process of producing a methacrylate block copolymer according to an embodiment of the present disclosure.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted.

Also, it is to be understood that the terms "include" or "have" are intended to indicate the existence of elements disclosed in the specification, and are not intended to preclude the possibility that one or more other elements may exist or may be added.

In this specification, terms "first," "second," etc. are used to distinguish one component from other components and, therefore, the components are not limited by the terms. An expression used in the singular encompasses the expression of the plural, unless it has a clearly different meaning in the context. The reference numerals used in operations are used for descriptive convenience and are not intended to describe the order of operations and the operations may be performed in a different order unless otherwise stated.

Hereinafter, operating principles and embodiments of the present disclosure will be described with reference to the accompanying drawings. The present disclosure relates to a method of producing a methacrylate block copolymer, particularly to, a method of producing a block copolymer of a methacrylate polymer and an acrylate polymer having enhanced heat resistance and impact resistance with excellent transparency and weather resistance.

According to the present disclosure, at least one or two polymerization methods selected from bulk polymerization, solution polymerization, emulsion polymerization, and suspension polymerization are used and a reversible addition-fragmentation chain transfer (RAFT) method is used as a mechanism for the selected at least one or two polymerization methods. That is, a termination reaction of polymer chain radicals is minimized by adding a RAFT agent enabling coexistence of an active state and a dormant state of growing radicals.

Upon comparison between radical polymerization and RAFT polymerization, productivity of the radical polymerization is generally higher than that of the RAFT polymerization in terms of reaction rate. However, since a coupling termination reaction may easily occur in growing polymer chains due to a high radical concentration, the efficiency of block copolymerization may decrease. Since a molecular weight of the polymer produced by the termination reaction is significantly increased, a polydispersity index of the polymer may be unnecessarily high. Also, it may be difficult to produce a designed block copolymer when such reactions excessively occur. According to the present disclosure, a block copolymer may be produced as designed by using the RAFT method.

Figure 2:
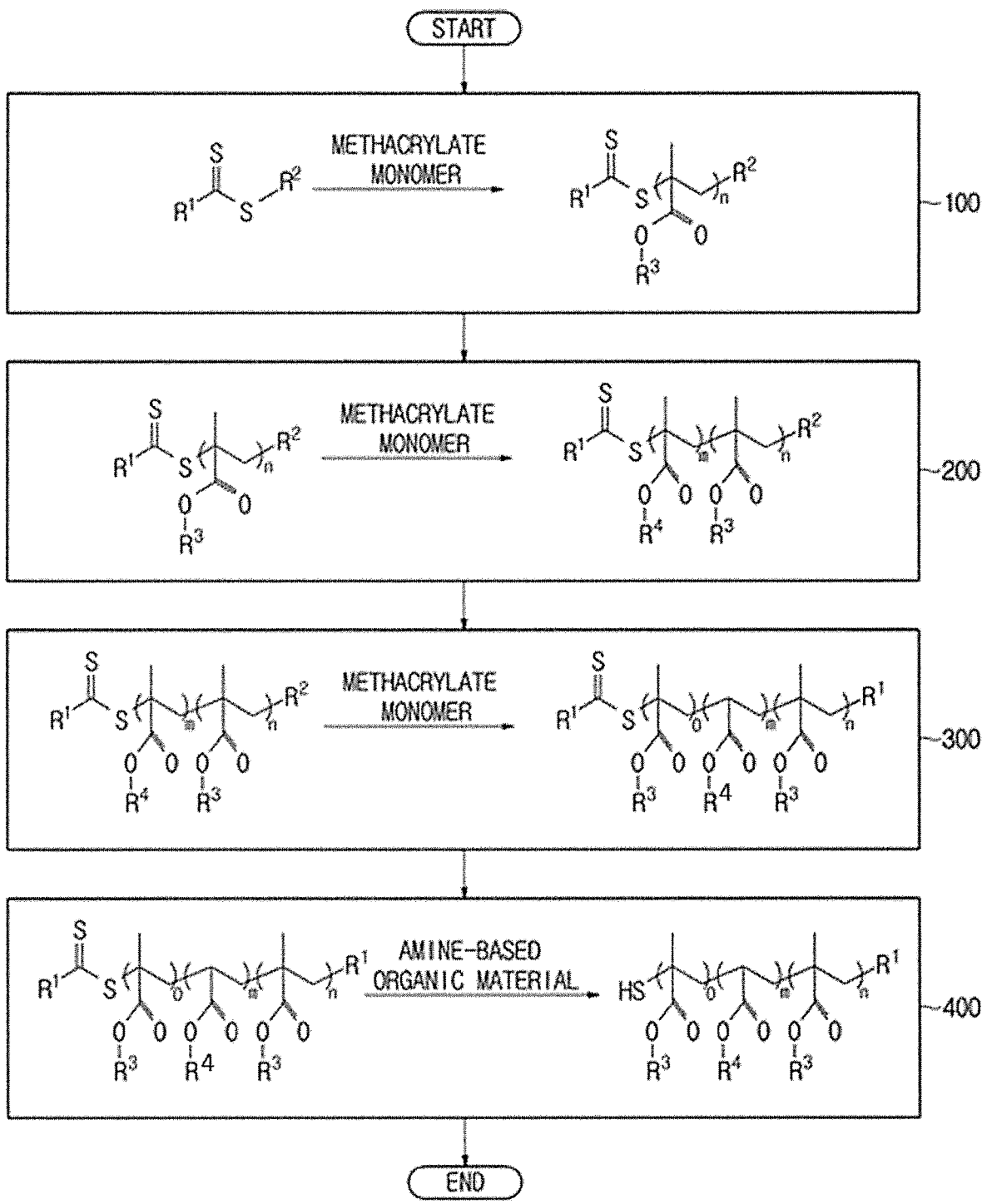
FIG. 2 is a conceptual diagram illustrating a polymerization process of the methacrylate block copolymer according to the embodiment of the present disclosure.

FIG. 1 is a flowchart illustrating a process of producing a methacrylate block copolymer according to an embodiment of the present disclosure. FIG. 2 is a conceptual diagram illustrating a polymerization process of the methacrylate block copolymer according to the embodiment of the present disclosure.

Referring to FIGS. 1 and 2, a method of producing a methacrylate block copolymer according to an embodiment of the present disclosure includes operations of (a) preparing a polymer solution including a methacrylate polymer block by polymerizing a methacrylate monomer using a polymerization initiator and a reversible addition-fragmentation chain transfer (RAFT) agent in the presence of water or an organic solvent (100 in FIGS. 1 and 2); (b) preparing a polymer solution including an acrylate polymer block-containing methacrylate diblock copolymer by adding an acrylate monomer and a styrene monomer to the polymer solution prepared in the operation (a) (200 in FIGS. 1 and 2); (c) preparing a polymer solution including a methacrylate polymer block-containing methacrylate triblock copolymer by adding a methacrylate monomer to the polymer solution prepared in the operation (b) (300 in FIGS. 1 and 2); and (d) collecting a polymer prepared after the operations (b) and (c) and removing the RAFT agent present at a terminal of the polymer by using an amine-based organic material (400 in FIGS. 1 and 2).

First, in the operation (a), the methacrylate monomer is polymerized using a polymerization initiator and a sulfur-based RAFT agent in the presence of water or an organic solvent to prepare the polymer solution including the methacrylate polymer block (100 in FIGS. 1 and 2). In this regard, any organic solvent commonly used in polymerization using a RAFT method may be used as the organic solvent.

For example, at least one selected from the group consisting of 1,4-dioxane, toluene, anisole, benzene, xylene, and dimethyl formamide may be used therefor.

Each operation of the polymerization may be performed under the same temperature condition or different temperature conditions within a predetermined range. For example, reaction temperature may be in a range of 65 to 90° C., preferably, 70 to 80° C.

In addition, at least one selected from the group consisting of methyl methacrylate (MMA), ethyl methacrylate, and cyclohexyl methacrylate may be used as the methacrylate monomer, but the available methacrylate monomer are not limited thereto.

Also, the polymerization initiator may be used in accordance with a solvent. At least one of azo-based initiators commonly used for radical polymerization such as azobisisobutyronitrile, 1,1'-azobis(cyclohexanecarbonitrile, a water soluble azo initiator VA-061, and a water soluble azo initiator V-501, and sodium persulfate may be used. According to an embodiment of the present disclosure, at least one selected from the group consisting of potassium persulfate, ammonium persulfate, and sodium dodecyl sulfate may be used.

In addition, at least one of dithioester and trithiocarbonate may be used as the RAFT agent. In this regard, dithioester includes a compound represented by Formula 1 below.

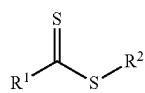

Formula 1

In Formula 1, R1 includes at least one selected from the group consisting of an alkyl group, a cycloalkyl group, and an aryl group having 1 to 20 carbon atoms, and R2 is an alkyl group having 1 to 8 carbon atoms. At least one hydrogen atom of the alkyl group of R1 or R2 is substituted with at least one functional group selected from the group consisting of a hydroxyl group, a carboxyl group, and a cyano group.

In addition, trithiocarbonate includes a compound represented by Formula 2 below.

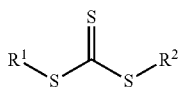

Formula 2

In Formula 2, R1 includes at least one selected from the group consisting of an alkyl group, a cycloalkyl group, and an aryl group having 1 to 20 carbon atoms, and R2 is an alkyl group having 1 to 8 carbon atoms. At least one hydrogen atom of the alkyl group of R1 or R2 is substituted with at least one functional group selected from the group consisting of a hydroxyl group, a carboxyl group, and a cyano group.

In this regard, the polymerization initiator and the RAFT agent may be added in a molar ratio of in a range of 1:5 to 10. When the amount of the RAFT agent in a molar ratio of the polymerization initiator to the RAFT agent is less than 5, a polydispersity index of the methacrylate block copolymer may increase. When the amount of the RAFT agent in a molar ratio of the polymerization initiator to the RAFT agent is greater than 10, productivity may deteriorate in terms of reaction rate. In addition, the RAFT agent and the monomer may be added in a molar ratio of in a range of 1:100 to 500. When the amount of the monomer in a molar ratio of the RAFT agent to the monomer is less than 100, a molecular weight of the methacrylate block copolymer may be too small. When the amount of the monomer in a molar ratio of the RAFT agent to the monomer is greater than 500, productivity may deteriorate in terms of reaction rate.

Next, the method of producing a methacrylate block copolymer according to the embodiment of the present disclosure may include adding an acrylate monomer and a styrene monomer to the polymer solution prepared in the operation (a) (200 in FIGS. 1 and 2) without collecting the polymer solution of the methacrylate polymer prepared in the operation (a) from the reactor. The acrylate monomer used herein may include at least one selected from the group consisting of methylacrylate, ethylacrylate, butylacrylate, and hexylacrylate, but the available acrylate monomer are not limited thereto. Also, the styrene monomer may include at least one selected from the group consisting of styrene, α-methylstyrene, p-bromostyrene, p-methylstyrene, p-chlorostyrene, and o-bromostyrene, but the available styrene monomer are not limited thereto.

In this regard, the RAFT agent and a monomer compound of the acrylate monomer and the styrene monomer may be added in a molar ratio of in a range of 1:100 to 500. When the amount of the monomer compound in a molar ratio of the RAFT agent to the monomer compound is less than 100, a molecular weight of the methacrylate block copolymer may be too small. When the amount of the monomer compound in a molar ratio of the RAFT agent to the monomer compound is greater than 500, productivity may deteriorate in terms of reaction rate.

Next, the method of producing a methacrylate block copolymer according to the embodiment of the present disclosure may include adding a methacrylate monomer to the polymer solution prepared in the operation (b) (300 in FIGS. 1 and 2) without collecting the polymer solution of the methacrylate diblock copolymer prepared in the operation (b) from the reactor.

In this regard, the methacrylate monomer may include at least one selected from the group consisting of methyl methacrylate (MMA), ethyl methacrylate, and cyclohexyl methacrylate, but the available methacrylate monomer are not limited thereto. Meanwhile, when the methacrylate monomer used in this operation is the same as the methacrylate monomer used in the operation (a), polymerization may be more efficiently performed.

In addition, the RAFT agent and the monomer may be added in a molar ratio of in a range of 1:100 to 500. When the amount of the monomer in a molar ratio of the RAFT agent to the monomer is less than 100, a molecular weight of the methacrylate block copolymer may be too small. When the amount of the monomer in a molar ratio of the RAFT agent to the monomer is greater than 500, productivity may deteriorate in terms of reaction rate.

Next, the method of producing a methacrylate block copolymer according to the embodiment of the present disclosure may include collecting the methacrylate block copolymer prepared after the operation (b) or (c) by precipitation and removing a dispersion stabilizer, if required, and then removing the RAFT agent remaining at a terminal of the methacrylate block copolymer by using an amine-based organic material (400 in FIGS. 1 and 2).

In this regard, the amine-based organic material used herein may include at least one selected from the group consisting of a primary amine including propyl amine, n-butyl amine, t-butyl amine, n-hexyl amine, and n-octylamine, a secondary amine including pyridine, pyrrolidine, piperidine, and pyrrole, and 2 equivalents of amines including imidazole, pyrimidine, and hydrazine, but the available amine-based organic material are not limited thereto.

The method of producing the methacrylate block copolymer according to the present disclosure has been described above. Hereinafter, examples and comparative examples of the methacrylate block copolymer prepared according to the method according to the present disclosure will be described for better understandings.

First, a polymerization method of the methacrylate copolymer will be briefly described. The methacrylate monomer and the RAFT agent, and the dispersion stabilizer, if required, are added to a reactor including water or an organic solvent, and polymerization is performed until 95% of more of the methacrylate monomer is consumed.

Next, the acrylate monomer and the styrene monomer are added to the reactor and polymerization is performed until 95% or more of the acrylate monomer is consumed. Then, the polymer solution including the methacrylate diblock copolymer is collected. After polymerization is performed until 95% or more of the acrylate monomer is consumed, the methacrylate monomer is added thereto.

Then, polymerization is further performed until 95% or more of the methacrylate monomer is consumed resulting in obtaining the methacrylate triblock copolymer. Next, the RAFT terminal group is removed using the amine-based organic material to prepare a purified polymer.

Hereinafter, methods of producing methacrylate block copolymers according to Examples 1 to 4 and Comparative Examples 1 and 2 will be described.

Example 1

A method of producing a methacrylate block copolymer according to Example 1 is performed using a RAFT method and includes a polymerization process of producing a methacrylate triblock copolymer by minimizing termination reaction of polymer chain radicals by using trithiocarbonate as the RAFT agent. According to Example 1, 100 g of water, 12.2 g of methacrylate, 0.8 g of sodium dodecyl sulfate, and 0.31 g of 4-cyano-4-[(dodecylsulfanylthiocarbonyl)sulfanyl]pentanoic acid (CPDA) were added to a 500 mL reactor filled with nitrogen and potassium persulfate was added thereto to perform polymerization at 70° C. After polymerizing methyl methacrylate, 18.7 g of n-butylacrylate and 5 g of styrene were added thereto and polymerization was further performed. Finally, 12.2 g of methyl methacrylate was added thereto and polymerization was further performed. The polymerization was terminated by exposure to oxygen and the resultant was obtained by precipitation. A terminal of the polymer chain was removed by adding n-butylamine to the obtained polymer.

Example 2

A methacrylate block copolymer was prepared in the same manner as in Example 1, except that the amount of methyl methacrylate was increased to 15 g and the amounts of n-butylacrylate and styrene were decreased to 14.2 g and 4 g respectively.

Example 3

A methacrylate block copolymer was prepared in the same manner as in Example 1, except that the amount of methyl methacrylate was increased to 17.5 g and the amounts of n-butylacrylate and styrene were decreased to 9.7 g and 3 g respectively.

Example 4

A methacrylate block copolymer was prepared in the same manner as in Example 1, except that the amount of methyl methacrylate was increased to 20.9 g and the amounts of n-butylacrylate and styrene were decreased to 6.2 g and 2 g respectively.

Comparative Example 1

Methyl methacrylate was polymerized in the same manner as in the initial operation of Example 1.

Comparative Example 2

Methyl methacrylate was polymerized in the same manner as in the initial operation of Example 1, except that 4-cyano-4-[(dodecylsulfanylthiocarbonyl)sulfanyl]pentanoic acid) (CPDA) was not added thereto.

Parameters of the final polymers prepared according to Examples 1 to 4 and Comparative Examples 1 and 2 were evaluated in the following manner.

Measurement of Molar Ratio

Molar ratios of n-butylacrylate to methyl methacrylate were analyzed using nuclear magnetic resonance (Varian VXR-Unity NMR 400 MHz).

Number Average Molecular Weight

Number average molecular weights were measured using a gel permeation chromatography device (Waters 1515 HPLC pump, Waters 2415 differential refractometer). Measurement was performed using two columns (Shodex GPC K-803, 804) and chloroform as a solvent at a rate of 1 mL/min at 35° C. Calibration was performed using polymethyl methacrylate standards.

Glass Transition Temperature

Glass transition temperatures of samples were measured using differential scanning calorimetry (Perkin Elmer Jade DSC). 15 mg of each sample was prepared and glass transition temperature thereof was measured by repeating a process of increasing temperature at a rate of 10° C./min between −50° C. and 150° C. twice.

Izod Impact Strength

Samples in the form of ASTM D256 were prepared using a specimen injection molding device (Lab Companion) without performing extrusion. An average value of each sample was obtained by performing impact strength tests five times using an impact strength tester (QMESYS QM700A). All tests were performed after cutting a notch on each sample.

Charpy Impact Strength

Samples in the form of ISO1791/eU were prepared using a mold and a heating press (Lab Companion) without performing extrusion. An average value of each sample was obtained by performing impact strength tests five times using an impact strength tester (QMESYS QM700A). Notches were not cut on the samples.

Evaluation results of parameters of the methacrylate block copolymers prepared according to Examples 1 to 4 and Comparative Examples 1 and 2 are shown in Table 1 below.

TABLE 1

| | Example 1 | Example 2 | Example 3 | Example 4 | Example 5 | Example 6 |
|---|---|---|---|---|---|---|
| Molar ratio of [n-butylacrylate]/[methyl methacrylate] | 0.47 | 0.32 | 0.21 | 0.17 | 0 | 0 |
| Presence or absence of RAFT agent | ○ | ○ | ○ | ○ | ○ | X |
| Number average molecular weight | 60500 | 71000 | 80000 | 88000 | 99400 | 90100 |
| Glass transition temperature (n-butylacrylate/methacrylate) | −33/117 | −33/122 | −35/122 | −38/119 | 125 | 102 |
| Izod impact strength (J/m) | 268.8 | 18.4 | 16.6 | 15.1 | 9.7 | 9.4 |
| Charpy impact strength (KJ/m$^2$) | 41 | 30 | 22 | 19 | 15 | 15 |

Referring to Table 1, glass transition temperatures of the samples prepared according to Examples 1 to 4 were observed in the range of about −38° C. to −33° C. in comparison with the sample prepared according to Comparative Example 1 in which n-butylacrylate was not used.

In addition, the samples of Examples 1 to 4 had lower glass transition temperatures than the glass transition temperature of 125° C. of the sample of Comparative Example 1 in which n-butylacrylate was not used and higher Izod impact strengths than the sample of Comparative Example 1. In other words, when block copolymerization was not performed, high glass transition temperature and low impact strength were observed even in the case where the RAFT agent is used as in Comparative Example 1.

It was also confirmed that the samples prepared according to Examples 1 to 4 had higher glass transition temperatures and higher Izod impact strengths than the sample prepared according to Comparative Example 2 in which the RAFT agent was not used.

Since the samples of Examples 1 to 4 were not subjected to extrusion, impact strengths thereof may be expected to be further improved by extrusion and injection molding at high pressure.

Figure 3:
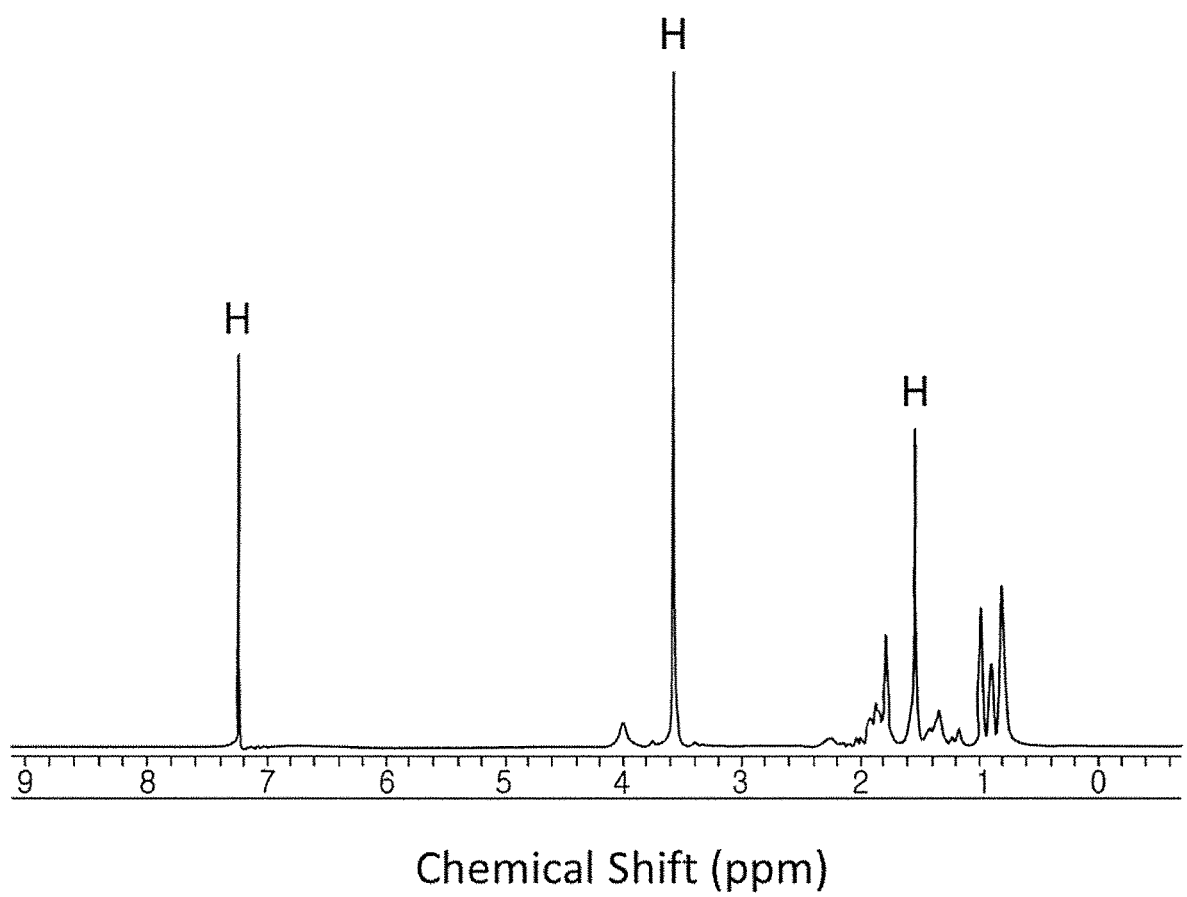
FIG. 3 illustrates $^1$H-NMR measurement results of the sample of Example 1.

FIG. 3 illustrates $^1$H-NMR measurement results of the sample of Example 1. Referring to FIG. 3, it may be confirmed that the sample of Example 1 includes not only methyl methacrylate but also n-butylacrylate. In general, since the chemical structures of methyl methacrylate and n-butylacrylate are not significantly different from each other, many peaks overlap in $^1$H-NMR measurement results. However, since an intrinsic peak of n-butylacrylate is observed at about 4.08 in the $^1$H-NMR measurement results and an intrinsic peak of methyl methacrylate is observed at about 3.68, the molar ratio of [n-butylacrylate]/[methyl methacrylate] of the sample according to Example 1 may be obtained by calculating an integral ratio of the peaks.

As is apparent from the above description, according to the method of producing the methacrylate block copolymer according to an embodiment of the present disclosure, a methacrylate block copolymer having excellent heat resistance and impact resistance with high transparency and excellent weather resistance may be provided. The methacrylate block copolymer prepared according to the method of the present disclosure may be applied to interior and exterior materials for vehicles, buildings, and electronic devices, and optical materials.

Although a few embodiments of the method of producing a methacrylate block copolymer according to embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of producing a methacrylate block copolymer, the method comprising operations of:
   (a) preparing a first polymer solution comprising a methacrylate polymer block by polymerizing a methacrylate monomer in the presence of a polymerization initiator and a reversible addition-fragmentation chain transfer (RAFT) agent in the presence of water or an organic solvent;
   (b) preparing a second polymer solution comprising an acrylate polymer block-containing methacrylate diblock copolymer by adding an acrylate monomer and a styrene monomer to the polymer solution prepared in the operation (a);
   (c) preparing a third polymer solution comprising a methacrylate polymer block-containing methacrylate triblock copolymer by adding a methacrylate monomer to the polymer solution prepared in the operation (b); and
   (d) collecting a polymer prepared after the operations (b) and (c) and removing the RAFT agent present at a terminal of the polymer with an amine-based organic material.

2. The method of claim 1, wherein a collected polymer in the operation (d) comprises 60 to 90% by weight of the methacrylate monomer, 10 to 40% by weight of the acrylate monomer, and 0.1 to 10% by weight of the styrene monomer based on a total weight of the collected polymer in the operation (d).

3. The method of claim 1, wherein the RAFT agent used in the operation (a) comprises at least one selected from the group consisting of dithioester and trithiocarbonate.

4. The method of claim 3, wherein the dithioester comprises a compound represented by Formula 1 below:

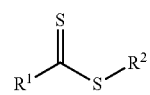

Formula 1 wherein R1 comprises at least one selected from the group consisting of an alkyl group, a cycloalkyl group, and an aryl group having 1 to 20 carbon atoms, and R2 is an alkyl group having 1 to 8 carbon atoms, at least one hydrogen atom of the alkyl group of R1 or R2 is substituted with at least one functional group selected from the group consisting of a hydroxyl group, a carboxyl group, and a cyano group.

5. The method of claim 3, wherein the trithiocarbonate comprises a compound represented by Formula 2 below:

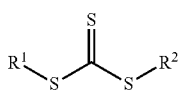

Formula 2 wherein R1 comprises at least one selected from the group consisting of an alkyl group, a cycloalkyl group, and an aryl group having 1 to 20 carbon atoms, and R2 is an alkyl group having 1 to 8 carbon atoms, at least one hydrogen atom of the alkyl group of R1 or R2 is substituted with at least one functional group selected from the group consisting of a hydroxyl group, a carboxyl group, and a cyano group.

6. The method of claim 1, wherein a molar ratio of the RAFT agent to each of the methacrylate monomer of the operation (a), the acrylate monomer and the styrene monomer of the operation (b), and the methacrylate monomer of the operation (c) is in a range of 1:100 to 500.

7. The method of claim 1, wherein a molar ratio of the RAFT agent to the polymerization initiator is in a range of 1:5 to 10.

8. The method of claim 1, wherein the methacrylate monomers used in the operations (a) and (c) comprise at least one selected from the group consisting of methyl methacrylate (MMA), ethyl methacrylate, and cyclohexyl methacrylate.

9. The method of claim 1, wherein the acrylate monomer used in the operation (b) comprises at least one selected from the group consisting of methylacrylate, ethylacrylate, butylacrylate, and hexylacrylate, and the styrene monomer comprises at least one selected from the group consisting of styrene, α-methylstyrene, p-bromostyrene, p-methylstyrene, p-chlorostyrene, and o-bromostyrene.

10. The method of claim 1, wherein the amine-based organic material used in the operation (d) comprises at least one selected from the group consisting of a primary amine comprising propyl amine, n-butyl amine, t-butyl amine, n-hexyl amine, and n-octylamine, a secondary amine comprising pyridine, pyrrolidine, piperidine, and pyrrole, and 2 equivalents of amines comprising imidazole, pyrimidine, and hydrazine.

11. The method of claim 1, wherein the polymerization initiator comprises at least one selected from the group consisting of azobisisobutyronitrile, 1,1'-azobis(cyclohexanecarbonitrile), a water soluble azo initiator 2,2'-azobis(2-(2-imidazolin-2-yl)propane, a water soluble azo initiator 4,4'-azobis(4-cyanovaleric acid), sodium persulfate, potassium persulfate, ammonium persulfate, and sodium dodecyl sulfate.

* * * * *